United States Patent [19]

Bull, Jr.

[11] 4,193,513
[45] Mar. 18, 1980

[54] NON-AEROSOL TYPE DISPENSER

[76] Inventor: Glen C. Bull, Jr., P.O. Box 686, Alexandria, Va. 22313

[21] Appl. No.: 789,004

[22] Filed: Apr. 19, 1977

[51] Int. Cl.² ............................................. G01F 11/00
[52] U.S. Cl. ......................................... 222/1; 222/95; 222/105; 222/153; 222/340
[58] Field of Search .................... 222/94, 95, 386, 153, 222/386.5, 387, 326, 103, 1, 340, 256, 260–262, 105, 107, 340–341, 389, 282, 291; 220/93, 404, 461, 460; 267/33, 153, 91, 94, 95; 221/227, 279, 1

[56] References Cited

U.S. PATENT DOCUMENTS

| Re. 26,488 | 11/1968 | Bull | 222/386.5 |
|---|---|---|---|
| 373,640 | 11/1887 | Brill | 267/33 |
| 1,971,450 | 8/1934 | Heitmuller et al. | 222/387 |
| 2,131,498 | 9/1938 | Chandler | 222/340 |
| 2,649,995 | 8/1953 | Muskin | 222/386 |
| 2,679,336 | 5/1954 | Frick | 220/461 |
| 2,822,165 | 2/1958 | Boschi | 267/33 |
| 3,130,964 | 4/1964 | Johnson | 267/33 |
| 3,377,003 | 4/1968 | Bacon et al. | 222/386 |
| 3,415,277 | 12/1968 | Mitchell et al. | 222/386.5 |
| 3,561,644 | 2/1971 | Works | 222/95 |
| 3,847,304 | 11/1974 | Cohen | 222/387 |
| 3,938,708 | 2/1976 | Burger | 222/95 |

Primary Examiner—H. Grant Skaggs
Attorney, Agent, or Firm—Laurence R. Brown

[57] ABSTRACT

The invention employs combination spring and sponge power to dispense fluids and semi-solids from a container. A spring or springs are preferably molded into a compressible foam mass, such as polyurethane, and the combination is then compressed and positioned within a container, along with the material to be dispensed. Expansion provides the dispensing power and additionally serves to fill the void which would otherwise be left in the container as the material is being dispensed. No aerosol type gases are employed. The material to be dispensed may be separated from the spring and sponge by a cup or circular plate. Further, the material to be dispensed, particularly if liquid, may be contained in a plastic bag and the spring and sponge are preferably contained in a plastic bag compressed and sealed and then locked for further venting ot the atmosphere. The evacuation of the bag's contents generally positioned above the spring and sponge will hold the contents in its natural state, as manufactured, until the spring/sponge/bag is vented to the atmosphere through an orifice in the container wall, thus making the container a mechanical pressurized device.

15 Claims, 8 Drawing Figures

NON-AEROSOL TYPE DISPENSER

PRIOR ART

The prior art is best shown by U.S. Pat. No. 3,445,043 granted to G. C. Bull. A compressible mass of intersticed foam material, such as a polyurethane sponge, is placed in a plastic bag and compressed within the bag, being evacuated of air to maintain its reduced, compressed configuration. This, in effect, locks the sponge in its compressed state. The bag and materials to be dispensed are then placed in the container, including fluent materials to be dispensed. The plastic bag has a neck penetrating the container wall with a removable cap for eventually venting the plastic bag to the atmosphere which enables the sponge to expand as material is dispensed so as to fill the container void created by the dispensed material. The power for dispensing is obtained solely from the elasticity and/or density of the foam sponge plus and the atmosphere.

This invention relates to storage containers and to methods for dispensing materials contained therein and is an improvement over U.S. Pat. No. 3,445,043. The invention utilizes compressed cellular intersticed material, such as artificial foam sponge material, with polyurethane foam sponge being the preferred compressible mass. Additional resilient means of greater magnitude than the foam, preferably a spring, is molded into the sponge mass to supply added force for incremental expansion not necessarily obtainable by the sponge alone.

The sponge and spring are preferably compressed to a maximum to provide optimum dispensing power, and upon expansion exert such force that the combination dispenses liquids, non-liquids, semi-solids and the like from the storage container. Expansion of the sponge and spring, also serves to fill in the container void, thus providing a back pressure which would otherwise be created as the fluent materials are dispensed.

In a preferred embodiment, the dispensing container, which may be of the aerosol type wherein the spring and sponge replace the power of a fluorocarbon mixture, is loaded with a non-liquid ingredient to be dispensed, separated by a cup or circular plate from the sponge and spring combination, which combination is included in an expandable or flexible bag (preferably or polyester or other suitable plastic type materials), and ideally is blow-molded to conform to approximately the container's internal dimensions. The plastic bag is vented to the atmosphere through an opening in the storage container. A cap means for selectively venting the bag normally seals the bag which may be evacuated to thereby selectively vent or maintain the spring and sponge compression previously held in a compressed or locked state. This is the best mode known to the inventor.

The circular plate, located within the bag in this instance is penetrated by a string which exits the container via the bag opening to permit manual compression of the sponge and spring. The cap seals the bag with the string in place to comprise dispensing means for selectively dispensing; and, upon release of the cap selectively permits dispensing pressure to be asserted against the contents, in incremental steps forcing the contents towards the orifice. In this embodiment the container contents are not in a plastic bag but the sponge and spring are in a bag. It may be regarded as the NO BAG/SPRING IN SPONGE (BAG) embodiment.

In the second embodiment of the invention, liquids are contained in a bag for dispensing and the spring and sponge are not in a bag, BAG/SPRING AND SPONGE ALONE (NO BAG).

In the third embodiment, semi-solids are dispensed with neither the contents nor spring and sponge being in a bag, but rather a cup separator serves to maintain the contents separate from the spring and sponge, NO BAG/SPRING AND SPONGE ALONE (NO BAG).

In the fourth embodiment, preferred for dispensing liquids of varying viscosity, both the contents to be dispensed and the spring and sponge are in separate bags, BAG/SPRING AND SPONGE (BAG).

The string method of locking the spring and sponge in place respresents only one method of compressing the spring and sponge. The contents under pressure while filling the container may serve to compress the spring and sponge; or a rod or rods temporarily surrounding the cup or plate may be employed to push or pull the cup or plate downwardly until the contents are loaded; or the weight of the product itself may be used to force the spring and sponge into position for locking. It is also, of course, within the contemplation of the invention to insert the spring and sponge in compressed form before the container bottom is attached and sealed to the remainder of the container.

The foam sponge of intersticed material may be manufactured from such materials as polyurethane, polythane, polyvinyl chloride or other synthetic, natural or plastic materials which in combination with springs provide sufficient storage pressure for the eventual dispensing operation. Conventional techniques are used in molding polyurethane, and the same are applicable to molding the polyurethane about a conventional spring, i.e., the sponge material follows the helix or other configuration of the spring to leave peripheral spacing so that the sponge does not buckle when compressed. This is similar to a pleated bellows type effect, such as in an accordian.

While the invention is useful in dispensing ketchup, jellies, cheese foods, sodas, tooth powders, and many other commercial dry products and products of varying viscosity, it has as additional advantage in dispensing beer and other carbonated liquids. Conventional tavern-type beer dispensers employ carbon dioxide gas to dispense draft beer; however, the manufacturer of the beer has carefully brewed the beer with optimum controlled $CO_2$ contents, often referred to as kraeusenizing. This latter technique affects the beer taste and its liveliness. It is therefore important, as a substitute for $CO_2$ gas, to provide a sufficient pressure on the beer product being dispensed, in order that carbonation does not separate from the beer while the beer is forced uniformly from the container.

The gas volume content of bottled beer may vary from 2.3 to as much as 3.0. The gas content in the brewers bottling tank usually ranges from 0.2 to 0.3 gas volumes higher than desired in the finished product in order to obtain this condition.

In order to prevent escape of gas from the beer, it is necessary to maintain an external pressure on the beer, known as the counter pressure. This generally represents approximately 2½ volumes of $CO_2$ gas or pressure in this instance to 1 volume of beer. This factor is also determined by the temperature of the product.

Other factors affecting beer pressure, other than temperature, are geographical location of the brewery, i.e., Denver, Colorado having an atmospheric pressure considerably less than that encountered at sea level or below (New Orleans). The carbonated pressures of beers are approximately 9.75 pounds per square inch at 35 degrees Farenheit and rises to 39 pounds per square inch at 80 degrees Farenheit. Beer is ideally generally consumed at 40-48 degrees Farenheit.

The invention improves over prior art U.S. Pat. No. 3,445,043 with respect to beer dispensing in that the beer is preferably contained in a plastic bag and the sponge and spring expand against the plastic bag via the circular plate or cup. The spring and sponge may be contained and compressed within another plastic bag or not. The reliability of a spring in exerting force is well known and, of course, it is possible to utilize compressible or expansionable springs of innumerable materials or strengths, and they are controllable. Hence, the flexibility of the invention enables pressure controllable dispensing of beer without undue foaming, without additional loss of carbonation and without affecting the product's taste, as well as from containers of any practical size and/or shape. The plastic bags, particularly of the polyester type, possess extreme barriers to permeation of gas and oxygen sensitive fluids. They are known to have a tensile strength greater than steel. Plastic bags alone are employed as containers for beer in England and other countries.

The invention will be better understood from a reading of the following detailed description thereof when taken in light of the accompanying drawings, wherein.

Figure 1:
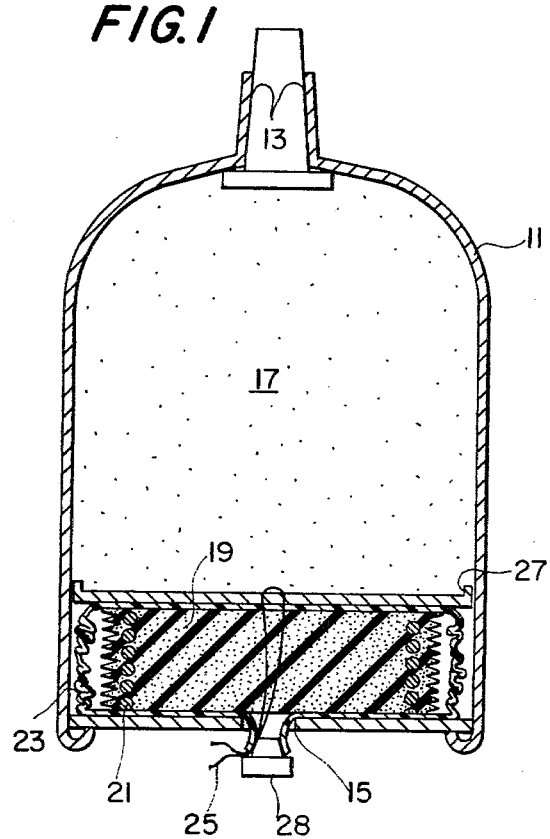
FIG. 1 is a view in section of the NO BAG/BAG SPRING AND SPONGE embodiment.

In FIG. 1 the dispensing container 11, includes a dispensing orifice 13, and an opposite end opening 15. The container 11, and orifice 13, may be conventional and the container 11, is loaded with a non-liquid ingredient 17, to be dispensed.

Figure 1A:
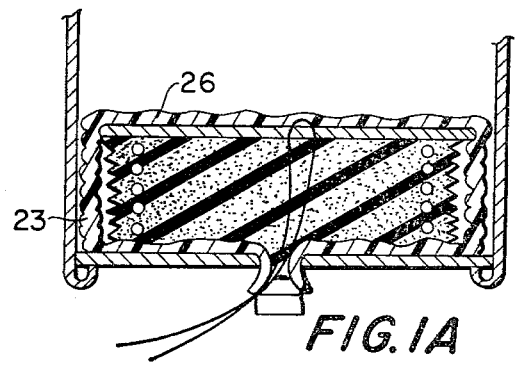
FIG. 1a is a view in section of a modification of FIG. 1.
Figure 2:
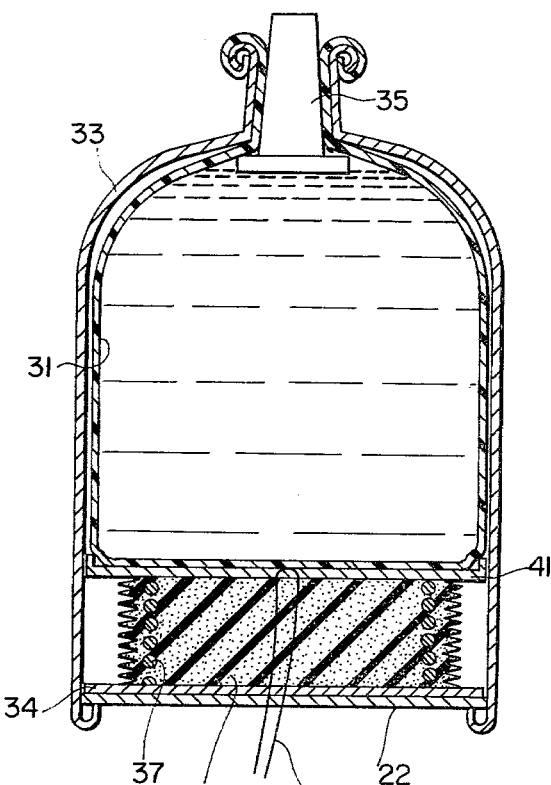
FIG. 2 is a view in section of the BAG/NO BAG SPRING AND SPONGE embodiment.

The sponge 19, and spring 21, are illustrated in compressed locked condition within plastic bag 23. Buckling of the sponge is avoided due to the configuration implanted by the molding technique. String 25, penetrates cup 27 through the spring and sponge, and exits container 11, via opening 15, for enabling manual compression of the spring and sponge. Since the bottom 22, (as shown in FIG. 2), of container 11, is preferably crimped to the lower peripheral wall of the container, it is possible to compress the sponge externally of the container prior to the crimping step. Cap 28 (as shown in FIG. 1), is provided to seal the bag 23, in container 11. The string or wire 25, is then either removed and bag sealed or sealed together with the vent. Cup 27, may be replaced by a plain flat circular plate 26, located within the bag 23, (as shown in FIG. 1a) its purpose being two-fold. First it aids compression of the sponge and spring and secondly it separates the contents 17, from the dispensing structure.

In FIG. 2 the BAG/NO BAG SPRING AND SPONGE embodiment is illustrated. This embodiment differs from that of FIG. 1 in that it includes the provision of plastic bag 31, for the materials to be dispensed which may now be liquids or semi-liquids of varying viscosity. The bag 31, is preferably sealed to the upper wall of the container 33, or collar (not shown), about the dispensing opening 35, or it may include a neck to be crimped and extend beyond container 33, thus requiring no sealing operation. Lower circular plate 34, is also penetrated by string 36 (opening not shown), and adds rigidity to the dispensing structure. The other difference is the fact that the spring 37, and sponge 39, are not contained in a bag. Again either a flat circular plate or cup 41, may be employed beneath the bag 31.

Figure 3:
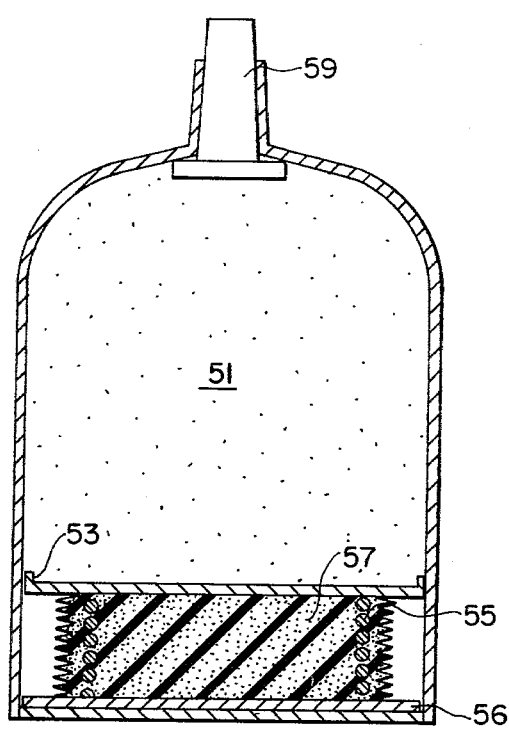
FIG. 3 is a view in section of the NO BAG/NO BAG SPRING AND SPONGE embodiment.

The FIG. 3 embodiment is particularly useful for dispensing semi-solids 51, and preferably includes the cup 53, for use in piston-like fashion to dispense the ingredients 51. The compressed spring 55, and sponge 57, expand as a result of depressing the conventional plunger 59; however, plate 56, is optional.

Figure 4A:
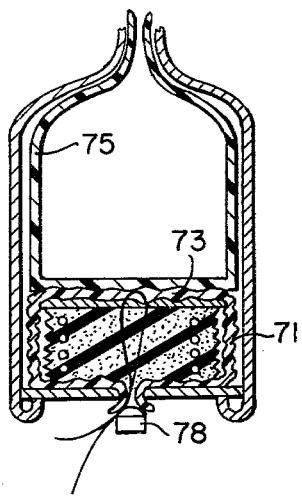
FIG. 4A is a partial view in section showing the separating plate between the sponge and the materials to be dispensed located within the bag.
Figure 4:
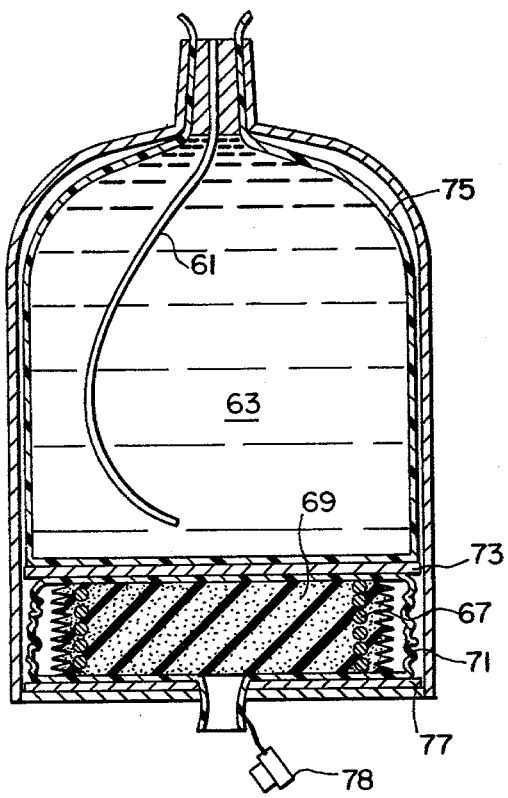
FIG. 4 is a view in section of the BAG/BAG SPRING AND SPONGE embodiment.

The FIG. 4 embodiment of BAG/BAG SPRING AND SPONGE is primarily designed for use with a conventional spray of pump which includes the use of flexible spike or pigstail 61, extending into the liquid 63, for dispensing.

The spring 67, and sponge 69, expand in bag 71, to elevate the undispensed liquid 63 in a piston-like fashion. Circular plate 73, is interposed between upper bag 75, and lower bag 71. Lower circular plate 77, includes holes in its center for the compression string (not shown). Cap 78, seals bag 71, and, if desired, the container. The plastics accommodate the compression string while still sealing.

THE PLASTIC TYPE BAG

Construction of the bags, particularly those including materials to be dispensed, such as 31 and 75, is preferably of a polyester material approved by FDA, such as manufactured by E. I. Dupont under the trademark Mylar or Standard Oil Company of Ohio equivalent product Vistron (trademark).

Other materials and resins suitable for bag construction and FDA approved are manufactured by Monsanto Chemical Company and Borg-Warner Corporation. Such material are available in sheet or resin form and are suitable for blow or stretch molding, as well as sheet formed bag applications. In certain instances flexible bags, such as rubber, may be used.

Ideally the bag containing the spring and sponge, such as 23, as well as the products to be dispensed, would be blow or stretch blown from the polyester-type resins in order to conform to the internal dimensions of the container. Typically, the bag should be slightly larger than the container's internal dimensions in order that the bag if too tight will not restrict the pressure movement of the spring and sponge. It is equally important that the neck of the bag (also blow molded) conform to the design of the container's orifice without presenting the problem of gathering the sheet folded bag at the neck and thus causing the possiblility of leaks due to improper crimping or sealing of the gathering process of sheet material.

The bag materials mentioned are of sufficient strength and toughness and impermeability to contain any pressures of fluent or semi-solids anticipated by the practice of this invention including, the spring and sponge.

The sealing of the bag to the container wall or orifice is accomplished by any one of several techniques depending upon the container's construction, metal, plastic, or paper and its overall design configuration.

Metal containers are particularly difficult for sealing of bag materials to metals. Metal to plastic bag sealing is best accomplished by heat crimping to the fringes of the orifice or the use of solvent seals or both.

One solvent approved by FDA is found to be particularly suitable, i.e., E. I. Dupont #46960 polyester adhesive, combined with RC-803 curing agent in the proper proportions.

The use of laser, dielectric heat, or ultrasonic fusing techniques are well known and in the state of the art, as of course are ordinary heat press techniques.

The most desirable bag thickness has been found to be 2.5 to 4 mil. in order to maintain optimum flexibility of both the bag containing the fluent materials and the spring and sponge.

The purposes of the spring being molded into the foam are manifold. There are several types of springs that may be employed for this purpose, each type yielding varying elasticity, but the most common type is a typical expandable coil-type metal spring. Plastic or even paper springs may be similarly employed for sophisticated applications.

There are trade-offs where a sponge, less resilient than the optimum, could be employed and combined together with a spring of vastly greater power than the sponge, thus the less dense foam would be used and the spring breaks away from the foam to force the product from the container. This method would allow for less initial space occupancy or maximum condensed area. In this instance the sponge acts as a servant for the spring and plate. With proper configuration this allows for the maximum compression in the least amount of space. At the same time the sponge and spring fill in the containers void.

FOAM SPONGE MATERIAL

Urethane sponge materials are generally produced by the chemical reaction of polyols and isocyanates.

The flexibility of the foam is dependent upon the molecular weight and mixtures of the polyol and isocyanate used. By varying this mixture, almost any degree of flexibility or elasticity may be produced. The molding of a spring or springs within this formula offers no problem to the manufacturer who is familiar with molding techniques.

Standard densities of high resiliency polyurethane foam appears to be the most suitable product for molding the spring into the foam.

By the technique of inserting expanded styrene beads into the foam during production, the compression or elasticity of the material can be controlled to allow for a surface softness and inner firmness or vice versa. This configuration combined with the spring gives an optimum controllable pressure suitable for expelling almost any fluent material of varying viscosity.

The expansion effort of the spring and sponge and plate can be maximized to the point of separation of the spring and plate from the less dense sponge at the latter stages, thus allowing for a final thrust or push by the spring and plate, if required.

By proper sponge/spring configuration, as illustrated in FIG. 1 of the drawing, the danger of side-wise expansion is eliminated. Such side expansion, if not controlled by proper configuration or design of the sponge, could bind the sponge to the side of the bag and in turn the container's wall, and could in some instances prevent its full expansion.

It is important to re-state that the spring/sponge when fully expanded and the container's contents expelled, occupy substantially the same space or void as the spring/sponge takeover where the fluent materials in the bag were previously positioned.

Still another advantage of the sponge is to keep the spring in upright position without shifting from side to side, as the product is evacuated.

There may be instances where more than one spring is molded into the sponge and may be employed and, in fact even be desirable. This is particularly true in large size containers such as 55 drums in which an additional spring positioned in the heart of the sponge would add spring/sponge power of added magnitude on difficult products to be dispensed; or in instances in which the temperature of the product to be dispensed makes dispensing the product difficult.

In instances in which the spring and sponge are employed without the bag, the outer periphery of the sponge may be dipped in a plastic providing a smooth thin coating on the outer edge of the sponge in order that the expansion within the container may take place without the sponge absorbing condensation from the inner wall of the container.

These and other obvious manufacturing and loading techniques may be employed in the practice of this invention to utilize the maximum advantages for dispensing fluent and semi-solid materials using spring/sponge power.

Figure 5:
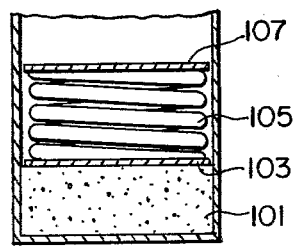
FIG. 5 shows a sponge separated from a spring for achieving spring/sponge power.
Figure 6:
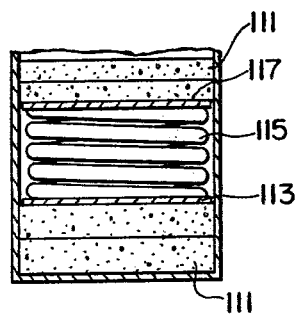
FIG. 6 is a different embodiment from the apparatus of FIG. 5, and illustrates a multiple sponge configuration above and below the spring; and, FIG. 7 shows a modification of FIG. 6.
Figure 7:
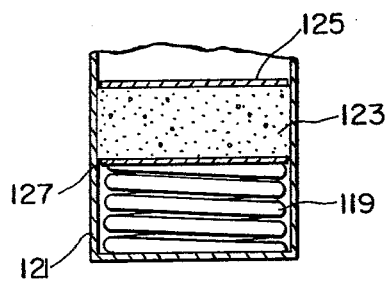

Further modifications of the present invention include the embodiments of FIGS. 5, 6 and 7. In FIG. 5 sponge 101, is disposed beneath movable plate 103, above which is located spring 105. Optionally plate 107, may separate spring 105 from whatever contents are being dispensed with or without bagging.

In FIG. 6 a plurality of sponges 111, are shown situated beneath plate 113, and above plate 117, between which is located spring 115, and second plate 117.

In FIG. 7 the spring 119, is situated in the bottom of the container 121, with sponge 123, disposed between movable separator plates 125 and 127.

These embodiments illustrate the employment of sponge power coupled with spring power for efficient dispensing.

What is claimed is:
1. The method of dispensing material from a container having an orifice by means of an expandable member comprising the steps of,
   disposing within the container a combination spring and compressable mass of cellular intersticed material having the property of changing volume between expanded and compressable conditions within the container from substantially the entire volume of the container to a fraction of its volume;
   compressing the spring and mass to produce a void space within the container;
   filling the void space within the container with material to be dispensed;

releasing the spring and mass for simultaneous expansion of the combination of the spring and compressable mass to fill the void replacing dispensed material and thereby to force material through said orifice, wherein the spring cooperates with the mass and supplies thereto additional expansion force asserted against the materials, enclosing the spring and mass together with the plate in an impermeable plastic bag having a venting portion exposed to the atmosphere via an opening in the container evacuating the bag when the spring and mass are compressed, sealing the vent with a cap to maintain the spring and mass in a compressed state, and releasing the cap to vent air into the bag thereby to release the spring and mass for expansion of volume by entry of air thereinto thereby producing a force for dispensing of material through said orifice.

2. The method of claim 1 comprising the further step of, enclosing material to be dispensed within a plastic bag in communication with the orifice on the container for dispensing.

3. The method of dispensing material from a container having an orifice by means of an expandable member comprising the steps of, disposing within the container a combination spring and compressable mass of cellular intersticed material having the property of changing volume between expanded and compressable conditions within the container from substantially the entire volume of the container to a fraction of its volume wherein the mass contains air which is evacuated in its compressed configuration;

compressing the spring and mass to produce a void space within the container and holding them in compressed condition;

filling the void space within the container with material to be dispensed;

releasing the compressed spring and mass for simultaneous expansion of the combination of the spring and compressable mass to fill the void replacing dispensed material and thereby to force material from the entire volume of the container through said orifice by cooperation of the spring and the mass to exert expansion force against the materials to be dispensed;

enclosing the material to be dispensed in an impermeable plastic bag in communication with the orifice of the container;

evacuating said bag when the spring and mass are expanded;

surrounding the spring and mass with a second impermeable bag and maintaining said second bag evacuated to lock the spring and mass volume in place, and releasing the spring and mass by venting to the atmosphere said second impermeable plastic bag through an opening in said container communicating to said mass, thereby to expand the spring volume and force materials toward said orifice.

4. The method of loading and dispensing material from a container having an orifice and an attachable bottom, comprising the steps of, compressing a spring and compressable mass means toward the bottom to occupy only a portion of the container volume;

locking the so-compressed spring and compressable mass means against expansion;

attaching the bottom with said spring and compressable mass means to the container;

loading the remainder of container volume with material to be dispensed; and, selectively releasing the spring and compressable mass simultaneously for expansion of the volume over an incremental volume change thereby to apply a dispensing force against the material to dispense a portion thereof from the orifice.

5. The method of dispensing material from a container having an orifice with an expandable member within the container comprising the steps of, enclosing an expandable spring member in an evacuated impermeable plastic bag having an opening with removable stopper means;

disposing said spring and bag within a first portion of the container with the interior of said bag having a vent to the atmosphere via said opening extending outside the container;

compressing the spring member;

filling a second portion of the container not occupied by the spring with material to be dispensed; and selectively removing the stopper means thereby permitting some air to enter said bag for releasing the spring for partial expansion thereof into said second portion of the container thereby to supply a dispensing force to remove a part of said material through said orifice.

6. The method of claim 5 comprising the further step of, enclosing material to be dispensed within a second plastic bag in communication with the orifice on the container for dispensing.

7. Non-aerosol type dispensing apparatus with an expandable volume dispensing follower filling a void left by dispensed materials comprising in combination, a dispensing container having a dispensing orifice and including material to be dispensed;

dispensing means that permits dispensing a portion of said material including a spring and compressable mass of cellular intersticed material disposed in an impermeable plastic bag within said container displaced by materials dispensed therefrom and providing upon expansion from smaller to larger volume a dispensing force for dispensing some of said materials from said orifice;

separator plate means disposed in the bag and located between the dispensing means and said material to be dispensed wherein the spring and mass cooperatively expand with coupled expansion power greater than that of the mass over the full expansion range thereby to fully expel the materials from the container;

wherein the material is retained within the container in a plastic bag extending through the container and having a neck sealed in place in the orifice of said container, wherein the neck portion of the bag extending through the container is integrally formed with the bag to register in a shape conforming to the container contour in a single layer when sealed therein thereby preventing leakage from crimps and folds.

8. Non-aerosol type dispensing apparatus with an expandable volume dispensing follower filling a void left by dispensed materials comprising in combination, a dispensing container having a dispensing orifice and including material to be dispensed;

dispensing means that permits dispensing a portion of said material including a spring and compressable mass of cellular intersticed material disposed in an impermeable plastic bag within said container displaced by materials dispensed therefrom and providing upon expansion from smaller to larger volume a dispensing force for dispensing some of said materials from said orifice;

separator plate means disposed in the bag and located between the dispensing means and said material to be dispensed wherein the spring and mass cooperatively expand with coupled expansion power greater than that of the mass over the full expansion range thereby to fully expel the materials from the container;

wherein said impermeable bag is evacuated and closed to maintain a compressed volume of the dispensing means and further comprising, means for releasable sealing said plastic bag to the atmosphere extending externally of the container thereby to permit entry of air to develop an expansion of the volume of the dispensing means for providing dispensing force for a portion of said material through said orifice.

9. Dispensing apparatus comprising in combination, a dispensing container having a dispensing orifice for containing fluent material to be dispensed;

spring means comprising a compressible mass of cellular intersticed material that expands to a volume substantially filling the container disposed within the container partially to power dispensing upon expansion, said mass being expandable from a compressed smaller volume to occupy a greater volume displacing a void in said container left by material dispensed therefrom as the mass expands and thereby powers dispensing;

further elastic spring means also disposed within the dispensing container coupled to cooperatively further power dispensing by supplementing the dispensing force of said mass thereby to fully expel materials from the container, and means locking the spring means and further elastic spring means in compressed condition to reduce dispensing pressure therefrom on said fluent material;

wherein said mass means comprises a plurality of individual units disposed with said further elastic spring means therebetween.

10. Dispensing apparatus comprising in combination, a dispensing container having a dispensing orifice for containing fluent material to be dispensed;

spring means comprising a compressible mass of cellular intersticed material that expands to a volume substantially filling the container disposed within the container partially to power dispensing upon expansion, said mass being expandable from a compressed smaller volume to occupy a greater volume displacing a void in said container left by material dispensed therefrom as the mass expands and thereby powers dispensing; and further elastic spring means also disposed within the dispensing container coupled to cooperatively further power dispensing by supplementing the dispensing force of said mass thereby to fully expel materials from the container wherein said spring means and mass means comprise separate units disposed in layers; and, plates disposed on either side of at least one layer to separate the units from each other and from the materials to be dispensed.

11. Dispensing apparatus, comprising in combination, a dispensing container with an orifice for selectively releasing fluent material, spring means compressable in volume disposed within said container and elastically expandable to a greater volume thereby to power dispensing of said material through said orifice and to displace the void left by said materials, said spring means being expandable from a smaller compressed volume to a larger volume substantially displacing all the material storable within said container by occupying substantially the entire volume occupied by materials thereby to dispense material by force produced with expansion of the volume of the spring means, evacuable impermeable plastic bag means encompassing said spring means capable of locking the volume of the spring means in a fixed position, said bag means having a vent and selectively releasable stopper accessible outside said container permitting air to enter an evacuated bag to release the spring means for expansion of volume exerting force against materials in the container for dispensing them through said orifice wherein the material is in one end of the container, and the spring means in the opposite end and further including a rigid plate disposed within said bag between the spring and the material with a string extending therefrom outside the container.

12. Apparatus as defined in claim 11 wherein said plastic bag means comprises a plastic coating on the outer surface of the spring means.

13. Apparatus as defined in claim 11 including a separator plate between the bag and the material to be dispensed.

14. Apparatus as defined in claim 11 wherein the spring means comprises an elastic spring surrounded by a mass of cellular intersticed material.

15. Apparatus as defined in claim 14 wherein the material is retained within the container in an impermeable plastic bag with a neck sealed in place in the orifice of said container, having the neck portion of the bag extending through the container in a single layer made to register in a shape conforming to the container orifice contour thereby preventing leakage at the seal from crimps and folds in said bag.

* * * * *